Figure 1:
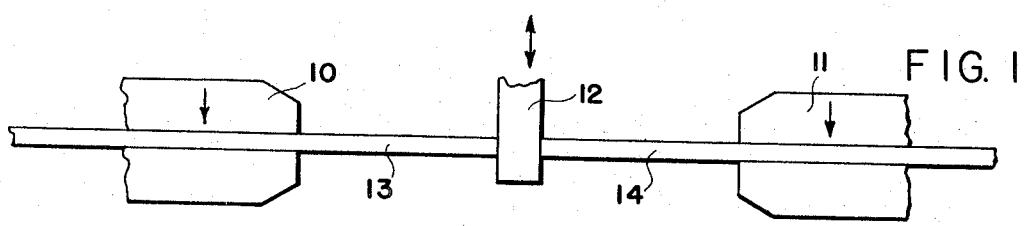
Figure 2:
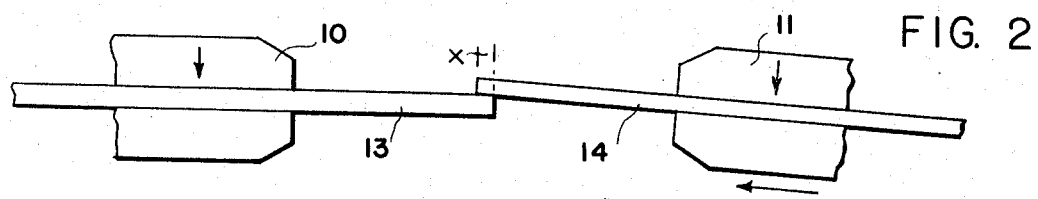

INVENTOR.
MELVIN M. SEELOFF
BY
Francis G. Klimpay
ATTORNEY

April 11, 1967   M. M. SEELOFF   3,313,911
METHOD OF JOINING METAL SHEET AND STRIP
Filed June 9, 1964

INVENTOR.
MELVIN M. SEELOFF
BY
Francis J. Klempay
ATTORNEY

United States Patent Office 3,313,911
Patented Apr. 11, 1967

3,313,911
METHOD OF JOINING METAL SHEET
AND STRIP
Melvin M. Seeloff, 2740 Atlantic St. NE.,
Warren, Ohio 44483
Filed June 9, 1964, Ser. No. 373,779
16 Claims. (Cl. 219—105)

This invention relates generally to the electric resistance welding art and more particularly to an improved method for joining metal sheet and strip in general edge-to-edge or end-to-end relation whereby a continuation of the principal surfaces of either workpiece may be effected. While not necessarily limited to such application such general method finds its greatest usefulness in joining strip lengths in end-to-end relation for the feeding of continuous strip to processing equipment and utilization lines—tube mills, for example. In the heavier gauges, flash-butt welds are commonly effected followed by the machining or scarfing off of the excess upset and flash metal to provide a joint which is flat and smooth and of the thickness of the parent strip. In the highter gauges, it has been common practice to lap weld the adjacent end portions of the workpieces together, with the overlap being of the order of $\frac{1}{16}$ inch to allow for substantial mashing down of the weld by the action of the welding electrodes and the following planishing rolls or peening hammers, if used, whereby the resultant welded overlapped joint may approach in thickness the initial thickness of the sheet or strip workpieces.

The above-mentioned joint thickness control is ordinarily important either in the final product or in subsequent processing, and heretofore various attempts have been made to effect narrow overlapped joints of good consistent quality and having a combined thickness substantially equal to the thickness of the parent metal. In actual practice, however, it has heretofore not been possible to achieve both results since if the attempt is made to effect the required thickness reduction either by the application of excess pressure to the welding electrodes or by the application of adequate force through planishing rolls or peening hammers the subsequent product is wavy and distorted. The problem is one of displacing the excess metal caused by the overlap and in the case of wide strip or welds of appreciable length it is not possible to provide space for the flow of this excess metal by the elongation of the strip or separation of the workpieces because of the very great strength of the welded strip or sheet in their own planes. When dealing with very narrow strip stock or short welds it is possible to progressively displace the excess metal ahead of the welding wheel or ahead of a planishing roll but this ordinarily requires edge trimming as will be understood.

It is accordingly the primary object of the invention to provide an improved strip or sheet joining procedure wherein the joining is effected by the rapid and simple overlapped seam welding method but wherein provision is made for accommodating the excess metal caused by the overlap uniformly throughout the width of the strip or along the length of the weld to enable the thickness of the weld to be readily reduced precisely down to the thickness of the parent sheet or strip.

A further object of the invention is to improve the quality of electric resistance lap seam welds in sheet and strip providing for the more consistent and intimate bonds of the interengaging surfaces of the workpieces.

Another object of the invention is to provide improvements in welding procedure as outlined above which may be carried out in a rapid and efficient manner by the use of equipment made readily available by the simple modification of proven apparatus now in widespread current use.

The above and other objects and advantages of the invention will become apparent upon consideration of the following specification and the accompanying drawing wherein there is disclosed certain preferred embodiments of the invention.

Figure 7:
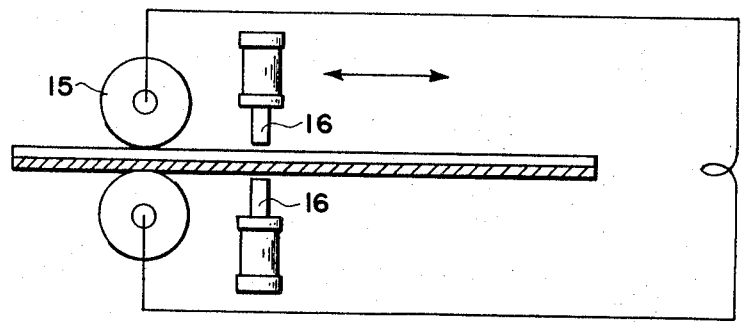
Figure 8:
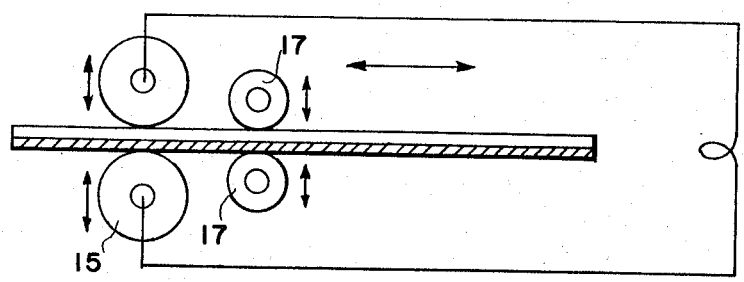
Figure 9:
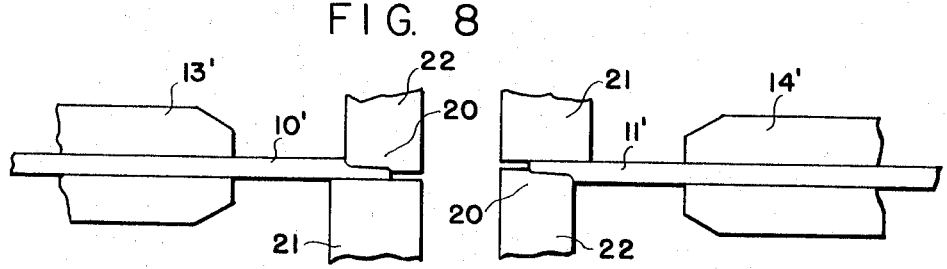
Figure 10:
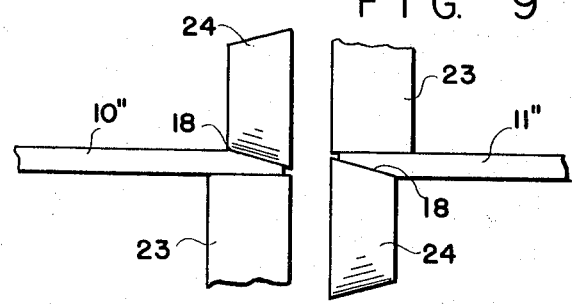

In the drawing:

FIGURES 1 thru 6 are schematic representations of apparatus showing, in sequence, the various steps of a preferred embodiment of the method of my invention, these views being taken in a direction transverse of strip being joined;

FIGURES 7 and 8 are schematic showings of apparatus which may be used in carrying out the method of my invention, the view showing, respectively, the use of peening hammers and planishing rolls and being taken in the longitudinal direction of the strip; and FIGURES 9 and 10 are fragmentary schematic showings of apparatus for preparing the edge portions of the sheet or strip workpieces to be joined preparatory to overlapping.

In the drawing, reference numerals 10 and 11 represent a pair of transversely extending but longitudinally spaced strip clamps of a more or less conventional narrow overlap electric resistance seam welder. Thus, the clamp 10 is normally fixed with respect to the machine base, not shown, and the guide thereon for the slidable support of the seam welding head. Such apparatus also commonly includes means to tilt the clamp 11 upwardly and to move this clamp toward the clamp 10 to effect an overlap in the strip preparatory to welding. Reference numeral 12 designates a retractable stop against which the strip lengths to be joined may be abutted in loading the machine.

In the illustration, strip length 13 held by clamp 10 is to be joined to strip length 14 held by clamp 11, and reference numeral 15 designates the wheel electrodes of a seam welding head which moves between the clamps 10, 11 transversely of the strip. In carrying out the method of my invention, this head may carry a pair of reciprocating peening hammers 16, as shown in FIGURE 7, or a pair of planishing rolls 17, as shown in FIGURE 8.

Critical aspects of the method of my invention are the bevel-like preparation of the edges to be joined and a predetermined relative positioning of these edges preparatory to the resistance welding step. As will appear later, such preparation may be accomplished directly in the welding machine while the workpieces are being held by the clamps, and while this is the preferred procedure it requires that means be provided to slightly and controllably retract the movable clamp (11). Also, while roller or wheel electrodes are necessary for welding wide strip, it will become apparent later that bar type of electrode dies may be used for narrow strip or for joining workpieces cut and/or bent from smaller metal sheets.

Since the method of the invention may be best understood by reference to the drawing which illustrates the sequence of steps the method will now be explained by reference to the various figures of the drawing. As explained above, the workpieces 13 and 14 are first loaded into the clamps 10 and 11, respectively, into abutting relation with the stop 12 which is retracted after the clamps are closed. Thereafter, the clamp 11 is manipulated by tilting and longitudinal movement to effect a slight overlap in the workpieces 13, 14 which for most work will be of the order of $\frac{1}{16}$ inch. This is represented by dimension X in FIGURE 2. The seam welding head of the machine which carries either the reciprocating peening hammer 16 or the pressure loaded planishing roll 17 is now actuated to traverse the strip with the hammers or rolls preferably leading the electrodes 15 and with the electrodes retracted from the strip and in non-energized condition.

Figure 3:
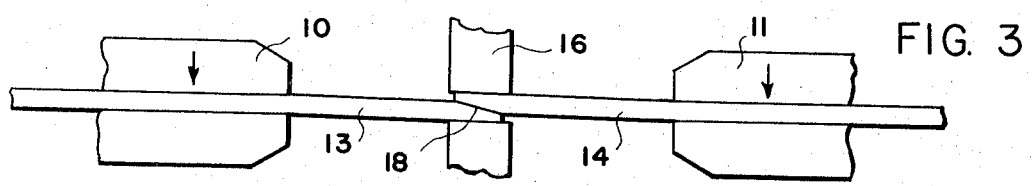

The effect of the above-mentioned traverse on the cold metal by the hammer's or planishing rolls is illustrated in FIGURE 3 wherein it will be noted that the interengaging surfaces of the strip lengths 13 and 14 is widened into interengaging faces 18 which lie in a plane making an acute angle with the plane or planes of the workpieces 13 and 14. Obviously, considerable mechanical energy and heavy compressive forces are exerted on the workpieces to result in the illustrated flat spread of the faces 18, and this action effects a most intimate continuous contact between the faces 18 of the respective workpieces which is highly desirable as will be more fully explained below.

Upon completion of the above described cold working traverse, one or both of the clamps 10, 11 are backed off slightly to a precisely controlled extent to cause the workpieces to slide slightly along the faces 18 and to thereby provide very small triangular recesses 19 at the extreme ends of the workpieces 13, 14, which recesses extend throughout the whole traverse extent of the strip. It should also be observed that this sliding retraction reduces the overall thickness of the cold work overlap, although such overall thickness is still somewhat greater than the parent thickness of the workpieces 13, 14. In actual practice, the retraction is such that although the area of the faces 18 which is available for welding is greater than heretofore, the excess metal which is available in the thickness of the overlapped joint after the weld fusion can be accommodated in the recesses 19.

After the above-mentioned retraction is completed, the head of the seam welder is again actuated with the electrodes 15 in leading position and properly pressurized and energized. In the process of this invention, somewhat less clamping force is required between the electrodes thereby contributing to the life of the electrodes, and, more importantly, avoiding the condition of pushing softened metal out ahead of or to either side of the electrodes, which is rather irregular, in conventional procedures resulting in waviness and uneveness in the final joint. During the welding traverse of the electrodes the peening hammer or the planishing rolls, which ever is used, are activated and/or pressurized to progressively compress the hot welded joint so as to displace the excess thickness metal into the recesses 19 and effect the final joint illustrated in FIGURE 6 wherein the end edge portions of the workpieces 13 and 14 are brought into a common plane and the thickness of the welded joint is precisely that of the thickness of the workpieces.

While I prefer in the practice of my invention to prepare the edges of the workpieces directly in the welding machine, as explained above, I also contemplate that such edge preparation may be effected either outside of the welding machine or within the welding machine prior to overlapping of the workpieces. Also, instead of effecting flat interengaging surfaces for welding, as shown at 18 in FIGURES 3 and 4, I may prefer the edges to the form shown in FIGURE 9 where rounded rabbets or recesses 20 are formed in the edges of the workpieces 10' and 11'. This may be done by bar dies 21, 22 or coining rolls while the workpieces are held in the clamps 13' and 14' which clamps may possibly be the clamps of the welding equipment, as will be understood. Of course, if the edges are formed separate from the welding machine or in the welding machine prior to overlapping, the subsequent overlap will be made in such manner that small transverse recesses will be left to receive the metal making up the excess thickness of the overlap in the manner explained above in connection with FIGURES 1 thru 6.

Figure 4:
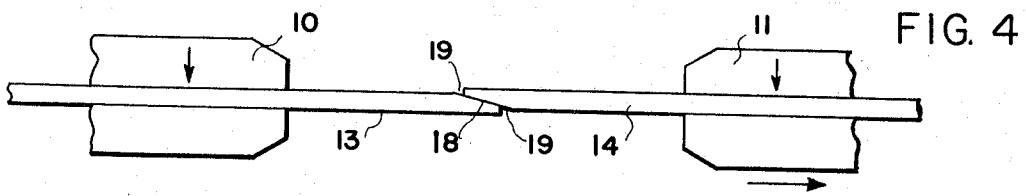
Figure 5:
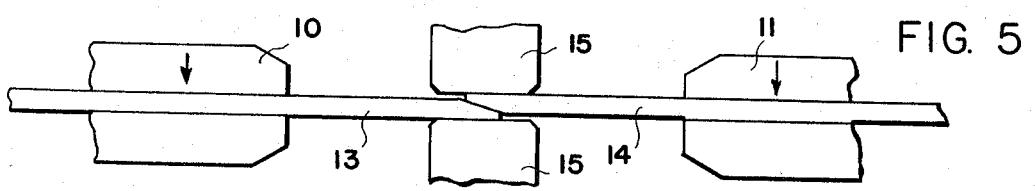
Figure 6:
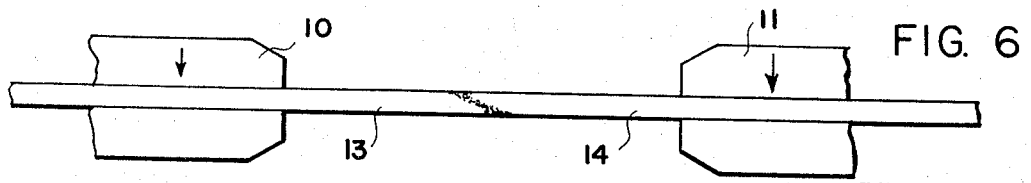

FIGURE 10 illustrates the forming of end edges in workpieces 10'' and 11'' to the same shape as the prepared edges shown in FIGURES 3 thru 5. In FIGURE 10, the edges are coined by dies 23, 24 which may be either of the bar or roller type, as will be understood. Again, upon the workpieces 10'' and 11'' being overlapped in the welding machine preparatory to welding, the relative positioning will be as shown in FIGURE 4 to provide for the recesses 19.

An important beneficial aspect of the method of the invention is that the interengaging weld faces 18 or 20 whether made automatically at the weld station of the welding machine or coined by separate dies has a flat slope with respect to the plane or planes of the workpieces. Thus, when the welding pressure and heat is applied, the coefficient of friction is such that there is no tendency for the workpieces to separate or slide away from each other and the resulting weld is accordingly more solid and consistent than has heretofore been obtained. Contributing to the consistent quality of the weld is the fact that the forming or coining of these faces hardens and brightens them so that a more intimate and uniform bond is obtained at the start of the flow of the welding current. The flat nature of the interengaging faces also allows a more optimum forging or welding pressure to be developed with a minimum deformation of the shape of the workpieces outside the confines of the welding dies.

The invention also makes possible the production of weld areas which are greater than the cross-sectional areas of the workpieces and the weld areas obtained by the conventional narrow lap mash seam process. In butt welding the first mentioned area is the maximum obtainable while in narrow lap mash seam welding, the shear action is such that a plane of cleavage is developed which is much more closely normal to the plane or planes of the workpieces. Accordingly, stronger and more dependable welds are obtained by the present process.

From the above description, it will be obvious that the essence of the invention is the initial special preparation of the end portions or edges of the workpieces to be joined together. This preparation may be accomplished in a number of ways, as explained above, either within or outside of the welding machine but the purpose is the same in all cases—to provide comparatively flat and expanded interengaging areas for welding as well as a reduction in the over-all thickness of the overlap to be welded together with recesses into which weld metal may flow to further assist in strengthening the joint and in reducing the ultimate thickness of the joint. For some applications, peening or other working of the joint after welding may not be required due to the excellence of the work accomplished by the welder with the disclosed prepared stock.

The herein described method has the further advantage in that the welding electrodes, particularly if of the wheel type, will be subjected to much less grooving or other cutting action which cause them to deteriorate rapidly. Higher welding pressures may be used to secure adequate ironing out of the joint or if ordinary pressures are used on the electrodes to be followed by subsequent working of the joint, the electrodes will have much longer life and require less continuing maintenance.

While in the appended claims I have, in some instances, referred to the working of the joint after welding as "cold-working," it will be understood that this is merely a generic term selected to cover the alternate possible methods of peening and cold-roll planishing. This term means that the working is accomplished without additional heating. Actually, if the step follows closely a wheel electrode, the metal may be still quite hot which may be desirable as an aid in the final forming of the joint. Other claims make no reference to cold-working since, as explained above, in some applications adequate final forming may be effected by the welding electrodes alone and, of course, I also contemplate that the final forming may, if desired, be accomplished by the application of additional heat from a torch, for example.

In addition to the above, the method of the invention provides a welded joint which is not only precisely the thickness of the parent stock but is also remarkably free of any waviness or distortion either in the weld zone or in the stock adjacent the same. Further, the surface flatness or finish of the weld zone itself is of much better quality than has heretofore been obtained by more conventional lap welding methods.

While the invention has been described above with special refernce to its application to the joining of strip in end-to-end relation, it should be understood that the invention is equally applicable to the welding of sheets, large and small, and to the fabrication of many articles made from sheet steel. For example, the invention is equally applicable to the edge welding of formed sheet metal components of home appliance cabinets.

Having thus described my invention what I claim is:

1. The method of joining metal sheet or strip workpieces comprising the steps of first narrowly overlapping adjacent edge portions of the workpieces to be joined together, applying a sufficient compressive force to the overlap to cause the interengaging edges thereof to be mashed down to establish on each workpiece a welding face angular but flatly related to the plane of the workpiece, thereafter backing off said workpieces slightly away from each other to expose narrow widths of said faces, welding the remaining interengaging portions of said faces together by an electric resistance process, and finally compressing the overlapped workpieces along the line of weld sufficiently to displace metal thereof onto said exposed narrow portions of said faces to reduce the overall thickness of the weld to substantially the initial thickness of the workpieces.

2. The method of joining metal sheet or strip workpieces comprising the steps of first narrowly overlapping adjacent edge portions of the workpieces to be joined together, working the overlap by applying compressive forces thereto to cause the overlap to be mashed down and to establish on each workpiece a welding face which engage each other and are each of an area substantially greater than the cross-sectional area of either workpiece, thereafter backing off said workpieces slightly away from each other to expose narrow widths of said faces, welding the remaining interengaging portions of said faces together by an electric resistance process, and finally compressing the overlapped workpieces along the line of weld sufficiently to displace metal thereof onto said exposed narrow portions of said faces to reduce the overall thickness of the weld to substantially the initial thickness of the workpieces.

3. The method of joining metal sheet or strip workpieces comprising the steps of first narrowly overlapping adjacent edge portions of the workpieces to be welded together, cold-working the overlap to widen the same while reducing the thickness thereof and to provide continuous and uninterrupted areas of contact between the workpieces, thereafter backing off said workpieces slightly away from each other to expose narrow widths of said previously interengaging surfaces, welding said surfaces together by an electric resistance process which also results in the filling of said narrow widths with weld metal, and cold-working the welded joint to smooth down the opposite surfaces thereof while reducing the thickness of the overlapped and welded joint down to the thickness of one of said workpieces.

4. The method of joining metal sheet or strip workpieces comprising the steps of first narrowly overlapping adjacent edge portions of the workpieces to be welded together, peening the overlap by a succession of hammer blows along the line of weld to widen the overlap while reducing the thickness thereof and flattening the sharp corners thereof as well as to provide continuous and uninterrupted areas of contact between the workpieces along the line of weld, thereafter backing off said workpieces slightly away from each other to expose narrow widths of said previously interengaging surfaces, and welding said surfaces together by an electric resistance process which also results in the filling of said narrow widths with weld metal.

5. The method of claim 4 including the further step of cold-working the welded overlapped edge portions to smooth out the opposite surfaces of the weld and to reduce the thickness of the welded overlap down to the thickness of at least one of said workpieces.

6. The method of joining metal sheet or strip workpieces comprising the steps of first preparing the edge portions of the workpieces to be joined together by generally tapering the same down toward the end extremities of said portions, said tapering being on one side surface only of each workpiece, overlapping said edge portions in such manner that the untapered side surfaces of said workpieces are outermost and backing off said workpieces slightly away from each other with said end extremities being spaced slightly from the inner end extremities of the generally tapering surfaces to expose narrow widths of said tapering surfaces and thereby provide a groove on each side surface of the overlap for the reception of weld metal, and welding said overlapped edge portions together by an electric resistance process while applying compressive pressure to fill said narrow widths with weld metal.

7. The method of claim 6 including the further step of working, by the application of pressure, the welded overlapped edge portions to smooth out the opposite surfaces of the weld and to reduce the thickness of the welded overlap down to substantially the thickness of at least one of said workpieces.

8. The method as recited in claim 7 wherein said further step of working by the application of pressure is done without the application of heat.

9. The method as recited in claim 7 wherein said further step of working by the application of pressure is done with sufficient heating of the workpieces so as to facilitate said reduction of thickness.

10. The method of joining metal sheet or strip workpieces comprising the steps of first preparing the edge portions of the workpieces to be joined together by working, by generally tapering said edge portions to reduce their average thickness and to coin thereon welding surfaces, said welding surfaces being on one side only of the respective workpieces with the opposite sides of the workpieces being in general continuation of the surfaces of the surfaces of the original workpieces, overlapping said prepared edge portions with the welding surfaces thereof being in mutual contact, backing off said workpieces slightly away from each other to provide grooves for receiving weld metal, and welding said surfaces together by an electric resistance process including the application of electrodes under pressure to said opposite sides of the overlap.

11. The method of claim 10 including the further step of working, by the application of pressure, the welded overlapped edge portions to smooth out the opposite surfaces of the weld and to reduce the thickness of the welded overlap down to the thickness of at least one of said workpieces.

12. The method of claim 11 wherein said last named working is done without heat.

13. The method of claim 11 wherein said last named working is done with sufficient heating of the overlapped edge portions.

14. The method of joining metal sheet or strip workpieces comprising the steps of first narrowly overlapping adjacent edge portions of the workpieces to be joined together, applying a sufficient compressive force to the overlap to cause the interengaging edges thereof to be mashed down to establish on each workpiece a welding face angularly but flatly related to the plane of the workpiece, thereafter backing off said workpieces slightly away from each other to expose narrow widths of said faces, welding the remaining interengaging portions of said faces together by an electric resistance process, and finally compressing the overlapped workpieces along the line of weld sufficiently to displace metal thereof onto said exposed narrow portions of said faces to reduce the overall thickness of the weld to substantially the initial thickness of the workpieces, while the workpieces are heated sufficiently to facilitate said reduction in thickness.

15. The method of joining metal sheet or strip workpieces comprising the steps of first planish rolling the edge portions of the workpieces to be joined together to reduce the average thickness of said portions and to coin thereon welding surfaces, said welding surfaces being on one side only of the respective workpieces with the opposite sides of the workpieces being in general continuation of the surfaces of the original workpieces, overlapping said prepared edge portions with the welding surfaces thereof being in mutual contact but restricting the width of the overlap to less than the widths of said welding surfaces to thereby expose narrow bands on opposite sides of the overlap for the reception of plastic metal which flows upon the application of the resistance welding current and pressure, and welding said overlapped surfaces together by an electric resistance process including the application of electrodes under pressure to the opposite sides of the overlap.

16. The method of claim 15 including the further step of working, by the application of pressure, the welded overlapped edge portions to smooth out the opposite surfaces of the weld and to reduce the thickness of the welded overlap down to the thickness of at least one of said workpieces.

References Cited by the Examiner
UNITED STATES PATENTS

| | | | |
|---|---|---|---|
| 403,708 | 5/1889 | Thomson | 219—105 X |
| 1,357,156 | 10/1920 | Von Eckermann | 219—105 |
| 2,016,360 | 10/1935 | Lutz | 219—83 |
| 2,362,388 | 11/1944 | MacChesney et al. | 219—117 X |
| 3,021,416 | 2/1962 | Mallett et al. | 219—82 |

FOREIGN PATENTS

| | | |
|---|---|---|
| 367,361 | 1/1923 | Germany. |
| 661,009 | 6/1938 | Germany. |
| 867,588 | 5/1961 | Great Britain. |

RICHARD M. WOOD, *Primary Examiner.*

B. A. STEIN, *Assistant Examiner.*